United States Patent [19]
Kai

[11] Patent Number: 5,267,015
[45] Date of Patent: Nov. 30, 1993

[54] PHOTOMETRIC APPARATUS

[75] Inventor: Tadao Kai, Kawasaki, Japan

[73] Assignee: Nikon Corporation, Tokyo, Japan

[21] Appl. No.: 26,187

[22] Filed: Mar. 1, 1993

Related U.S. Application Data

[63] Continuation of Ser. No. 770,365, Oct. 3, 1991, abandoned.

[30] Foreign Application Priority Data

Oct. 9, 1990 [JP] Japan .................. 2-269539
Oct. 22, 1990 [JP] Japan .................. 2-281808

[51] Int. Cl.$^5$ ............................................. G01J 1/44
[52] U.S. Cl. .................................. 356/218; 354/430
[58] Field of Search ............... 356/215, 218, 222, 229; 354/430

[56] References Cited

FOREIGN PATENT DOCUMENTS 62-19824  1/1987  Japan .
62-259022 11/1987 Japan .

Primary Examiner—Richard A. Rosenberger
Attorney, Agent, or Firm—Shapiro and Shapiro

[57] ABSTRACT

A photometric apparatus includes a charge accumulation type photoelectric transfer unit, a real time monitor unit for monitoring the intensity of incident light in a charge accumulation time of the photoelectric transfer unit, a counting unit for counting a time required for the output of the real time monitor unit to reach a predetermined threshold value, and a memory unit for storing the counted value of the counting unit. A brightness of an object is calculated using the previous counted value stored in the memory unit, the present counted value, the present charge accumulation time, and the A/D converted values of the individual pixel signals obtained on the basis of the present charge accumulation of the photoelectric transfer unit.

38 Claims, 10 Drawing Sheets

PHOTOMETRIC APPARATUS

This is a continuation of application Ser. No. 770,365 filed Oct. 3, 1991, now abandoned.

BACKGROUND OF THE INVENTION

1. Field of Invention

The present invention relates to a photometric apparatus for use in auto-focusing cameras which employs a charge accumulation type photoelectric transfer means which obtains a photometric value using the photoelectric transfer outputs and the charge accumulation times of normally used charge accumulation type photoelectric transfer elements. More particularly, the present invention pertains to a photometric apparatus which is capable of obtaining a highly accurate photometric value in a short period of time under a flickering light source, such as a fluorescent light.

2. Related Background Art

In conventional autofocusing cameras, it is impossible to obtain a highly accurate photometric value regarding the brightness of an object from the output of a focal point detection device structured by normally employed charge accumulation type photoelectric transfer elements under a flickering light source, such as a fluorescent light, because the photometric value obtained from the charge accumulated at the crest or trough of a flicker varies from the average brightness of the object.

Japanese Patent Application Laid-open Nos. 62-19824 and 62-259022 disclose a structure which is capable of eliminating influence of variations in the photometric value in a plurality of charge accumulation operations by using the average value of the charge accumulation time determined by a real-time monitor (hereinafter, this method is referred to as a hard auto gain control, and the charge accumulation time determined by this method is referred to as a hard auto gain control time) to obtain an accurate photometric value of the average brightness of an object. Here, the charge accumulation operation indicates series of operations including the charge accumulation, charge transfer, A/D conversion, and arithmetic operations.

In the focal point detection device structured by the charge accumulation type photoelectric transfer elements, a method of determining the charge accumulation time from the output obtained in the previous charge accumulation operation (hereinafter, this method is referred to as a soft auto gain control, and the charge accumulation time determined by this method is referred to as a soft auto gain control time) is also known.

In the apparatus driven by the soft auto gain control method, the charge accumulation output can be set to an optimum level independent of distribution of the brightness of the object.

However, in the apparatus driven by the soft auto gain control method, the charge accumulation output may be saturated due to the influence of the flicker of the light source. That is, if the previous charge accumulation operation is conducted at the trough of a flicker, i.e., if the previous charge accumulation operation is conducted in a dark state, the charge accumulation time for a subsequent charge accumulation operation (which means the present charge accumulation operation) may be set to a time longer than an actual time. If the present charge accumulation operation is conducted at a portion which is not the crest of the flicker, unlike the previous charge accumulation operation, the charge may be accumulated too much, saturating part (a bright portion) or the entirety of the charge accumulation output.

Saturation of the charge accumulation output means that there is no data on the brightness of the saturated portion. It is therefore undesirable to obtain a photometric value using such data.

In the above-described structure driven by the hard auto gain control time, the monitor element for controlling the charge accumulation time of the focal point detection device on a real time basis (normally a silicon photo diode) generally has a far smaller area than the light-receiving area of the pixel element groups of the apparatus which employs the monitor element. Therefore, the use of only the hard auto gain control time determined by the output of such a monitor element as the data on the brightness of the object deteriorates the accuracy of obtained photometric value.

Regardless of the type of the auto gain control, a charge accumulation operation requires the A/D conversion time which lasts 20 milliseconds to 50 milliseconds and the focal point detection time, in addition to the charge accumulation time and the charge transfer time. Therefore, quick photography of the camera is sacrificed by conducting the charge accumulation operation a plurality of times to enhance the photometric accuracy (four times in the case of Japanese Patent Application Laid-open No. 62-259022).

SUMMARY OF THE INVENTION

An object of the present invention is to provide a photometric apparatus driven under the soft auto gain control which is capable of obtaining a photometric value in a relatively short period of time, with a high degree of accuracy and without generating saturation under a flickering light source, such as a fluorescent lamp.

According to the first aspect of the invention, there is provided a photometric apparatus which comprises:

a charge accumulation type photoelectric transfer means;

a real time monitor means for monitoring the intensity of incident light in a charge accumulation time of said photoelectric transfer means;

a counting means for counting a time required for the output of said real time monitor means to reach a predetermined threshold value;

a memory means for storing the counted value of said counting means; and an operation means for calculating a brightness of an object using the previous counted value stored in said memory means, the present counted value, the present charge accumulation time, and the A/D converted values of the individual pixel signals obtained on the basis of the present charge accumulation of said photoelectric transfer means.

In the thus-arranged photometric apparatus, the photoelectric transfer means determines the present charge accumulation time on the basis of the output obtained by the previous charge accumulation. The real time monitor means monitors the intensity of incident light in the charge accumulation time of the photoelectric transfer means on a real time basis. The counting means counts the time required for the output of the real time monitor means to reach a predetermined threshold value. The memory means stores the counted value of the counting means. The brightness of the object is calculated using the previous counted value stored in the memory means, the present counted value by the counting means, the present charge accumulation time and the A/D conversion values of the present outputs of the individual pixels.

In one preferred mode, the time interval between the adjacent charge accumulation starting times is substantially an odd multiple of half of the flickering period of a light to be metered.

When a time which is substantially an odd multiple of half of the flickering period of the predetermined light to be metered has passed since the first charge accumulation operation was started, the second charge accumulation operation begins. An accurate average photometric value is obtained from the brightness value of the object obtained on the basis of the second charge accumulation operation using the hard auto gain control time for the first charge accumulation operation and the hard auto gain control time for the second charge accumulation operation as the correction values.

Another object of the present invention is to provide a photometric apparatus driven under hard auto gain control which is capable of obtaining a highly accurate photometric value under a flickering light source, such as a fluorescent lamp, immediately after the operation of the apparatus is started.

According to the second aspect of the invention, there is provided a photometric apparatus which comprises:

a photoelectric transfer means which can output at a high speed the outputs of individual pixels obtained by a first charge accumulation operation conducted immediately after the photometric apparatus is switched on without A/D conversion and which starts a second charge accumulation operation when a predetermined time passes after the first charge accumulation operation is started;

a real time monitor means for monitoring the intensity of incident light in a charge accumulation time of said photoelectric conversion means on a real-time basis;

a counting means for counting a time for the output of said real time monitor means to reach a predetermined threshold value;

a memory means for storing the counted value counted by said counting means in the first charge accumulation operation, the counted value obtained in the second charge accumulation operation, and A/D converted values of outputs of the individual pixels obtained in the second charge accumulation operation; and an operation means for calculating an brightness of an object on the basis of the data stored in said memory means.

In the thus-arranged photometric apparatus, a charge proportional to the intensity of light incident to the photoelectric transfer means is accumulated in the photoelectric transfer means. The counter counts the time required for the output of the real time monitor means to reach a predetermined threshold value in the first and second charge accumulation operations as the hard auto gain control time, and the operation means calculates the brightness of the object using the hard auto gain control time obtained in the first charge accumulation operation, the hard auto gain control time obtained in the second charge accumulation operation and the photometric value obtained in the second charge accumulation operation.

DETAILED DESCRIPTION OF THE PREFERRED EMBODIMENTS

A first embodiment of the present invention will be described below with reference to FIGS. 1 to 6.

Figure 1:
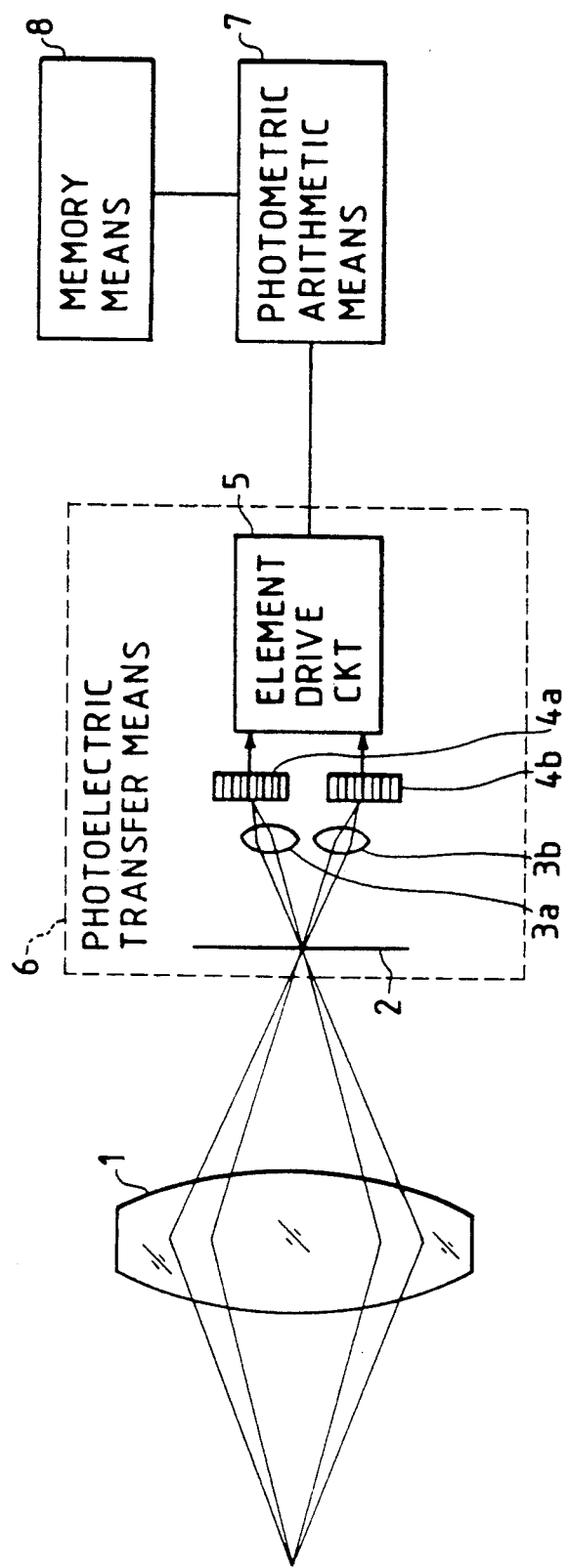
FIG. 1 is a schematic block diagram of an embodiment of the present invention.

This embodiment shown in FIG. 1 is applied to a known focal point detection device. However, the photometric apparatus of the present invention may be provided separately from the focal point detection device. Referring first to FIG. 1, reference numeral 1 denotes a photographic lens; 2, a film equivalent surface; 3a and 3b, lenses for forming an image; 4a and 4b, photoelectric transfer element groups; 5, an element drive circuit; 6, a photoelectric transfer means; 7, a photometric arithmetic means; and 8, a memory means.

In the photoelectric transfer means 6, an image of an area on the film equivalent surface 2 is formed separately on the photoelectric transfer element groups 4a and 4b by the image forming lenses 3a and 3b. In a focused state, the photoelectric transfer element groups 4a and 4b meter the same area.

Figure 2:
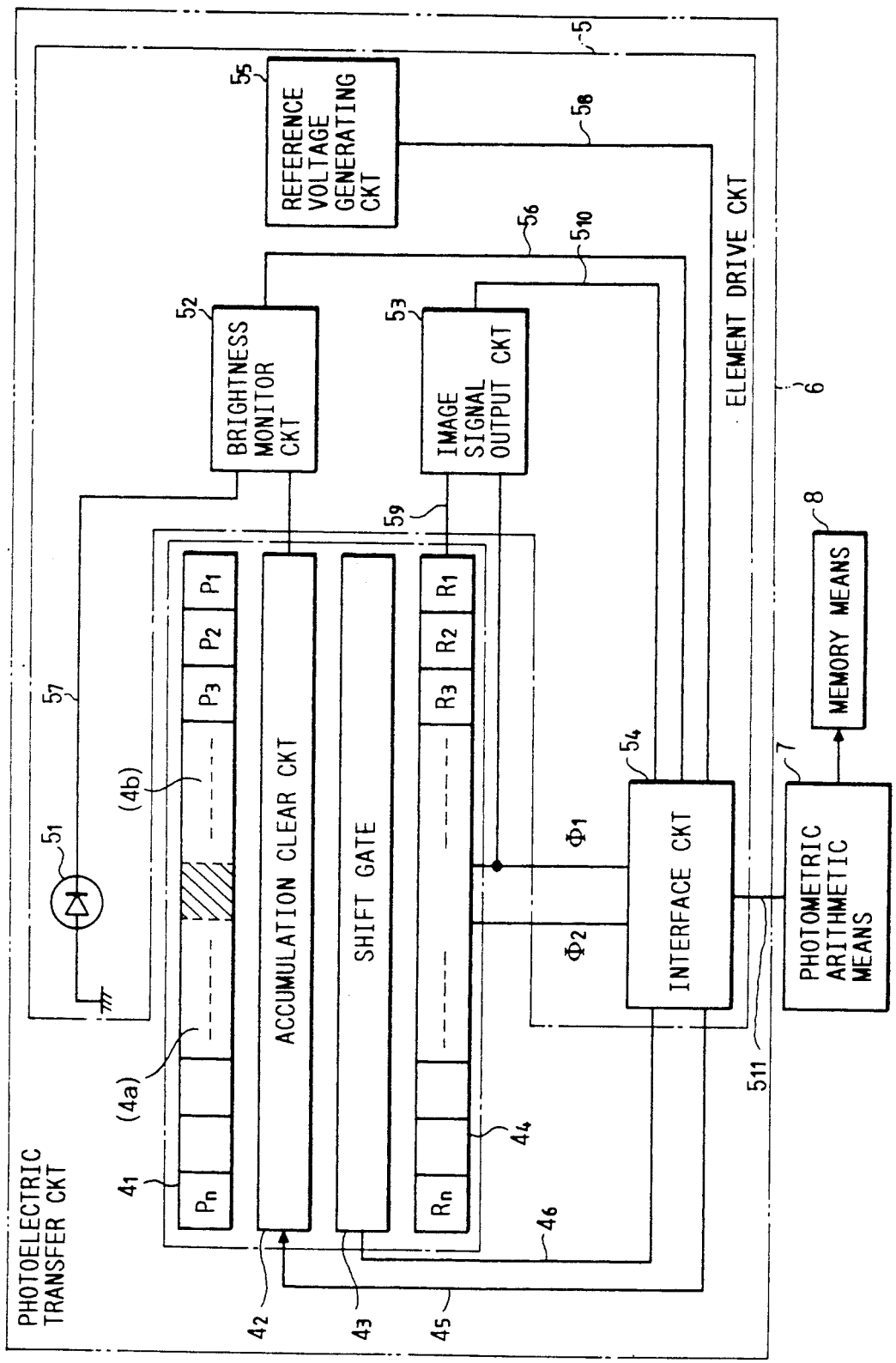
FIG. 2 is a block diagram of a photoelectric transfer means of FIG. 1.

FIG. 2 shows the structure of the photoelectric transfer means 6 of FIG. 1. The photoelectric transfer means 6 includes a photoelectric transfer unit 4 and the element drive circuit 5. The photoelectric transfer unit 4 includes a photo sensor array $4_1$ consisting of elements Pl to Pn, an accumulation clear circuit $4_2$ for initializing (resetting) the photo sensor array $4_1$, and a shift gate $4_3$ for transferring the charge accumulated in the photo sensor array $4_1$ to a CCD shift register $4_4$ consisting of elements Rl to Rn. The element drive circuit 5 includes a brightness monitor element $5_1$ provided close to the photo sensor array $4_1$, a brightness monitor circuit $5_2$, an image signal output circuit $5_3$, an interface circuit $5_4$, and a reference voltage generating circuit $5_5$. The right half of the photo sensor array $4_1$ is used as the photoelectric transfer element group 4b while the left half thereof is used as the photoelectric transfer element group 4a. The brightness monitor light-receiving element $5_1$ has the same length as and a very smaller area than the photo sensor array $4_1$.

The drive operation of the photoelectric transfer means will be described below. First, the first charge accumulation operation is conducted. Here, the first charge accumulation operation indicates a certain charge accumulation operation and does not indicate the operation conducted at the initial stage of the operation of the photoelectric transfer means 6.

An accumulation clear signal $4_5$ is sent from the interface circuit $5_4$ to the accumulation clear circuit $4_2$. When the transmission of the accumulation clear signal $4_5$ is completed, the individual photo sensors in the photo sensor array $4_1$ start accumulating a charge at a speed corresponding to the brightness of the object. The hard auto gain control time is obtained from an output signal $5_6$ of the brightness monitor circuit $5_2$ which is based on a light current $5_7$ of the brightness monitor light-receiving element $5_1$ and a reference voltage $5_8$ of the reference voltage generating circuit $5_5$.

After transmission of the accumulation clear signal $4_5$ is completed, the voltage of the output signal $5_6$ of the brightness monitor light-receiving element $5_1$ falls rapidly when the light current $5_7$ of the brightness monitor circuit $5_1$, corresponding to the brightness of the object, is bright, and falls slowly when the light current $5_7$ is dark. The interface circuit $5_4$ compares the output signal $5_6$ of the brightness monitor circuit $5_2$ with the reference voltage $5_8$ which is the output of the reference voltage generating circuit $5_5$, and outputs a hard auto gain control signal $5_{11}$ when both voltages equal.

The hard auto gain control timer signal $5_{11}$ is supplied to the photometric arithmetic means 7 which counts the time from the end of the accumulation clear signal $4_5$ supplied to the photometric arithmetic means 7 through the interface circuit $5_4$ to the generation of the hard auto gain control time signal $5_7$. The counted time is stored in the memory means 8 as the hard auto gain control time for the first charge accumulation operation.

The charge accumulation operation is completed by the soft auto gain control operated by the photometric arithmetic means 7. The photometric arithmetic means 7 counts the time between the end of the accumulation clear signal $4_5$ and the soft auto gain control time for the present charge accumulation operation which is determined on the basis of the previous charge accumulation operation beforehand. When the soft auto gain control time is up, the photometric arithmetic means 7 sends the soft auto gain control time signal to the interface circuit $5_4$. Upon receipt of the soft auto gain control time signal, the interface circuit $5_4$ sends a shift pulse $4_6$ to the shift gate $4_3$.

When the shift gate $4_3$ receives the shift pulse $4_6$, the charge accumulated in the photo sensor array $4_1$ is transferred to the CCD shift register $4_4$. Thereafter, the image signal output circuit $5_3$ processes an image signal $5_9$ obtained by a transfer pulse $\phi 1$ and a transfer pulse $\phi 2$ which is 180° out of phase with the transfer pulse $\phi 1$, generated by the interface circuit $5_4$, and outputs a resultant pixel signal $5_{10}$.

The pixel signal $5_{10}$ is supplied through the interface circuit $5_4$ to the photometric arithmetic means 7 which converts it into a digital signal. The obtained digital signal is stored in the memory means 8. The photometric arithmetic means 7 calculates a soft auto gain control time for a subsequent charge accumulation operation from the obtained pixel output and thereby prepares for the second accumulation operation.

When a predetermined period of time has elapsed since the beginning of the first charge accumulation operation (desirably, half of the flickering period) and after the charge has been transferred from the CCD shift register $4_4$, the second charge accumulation operation begins. The second charge accumulation operation is conducted in the same manner as the first charge accumulation operation. That is, the photometric arithmetic means 7 stores the obtained data in the memory means. It also stores the pixel output for the second charge accumulation cycle in the memory means 8.

Figure 3:
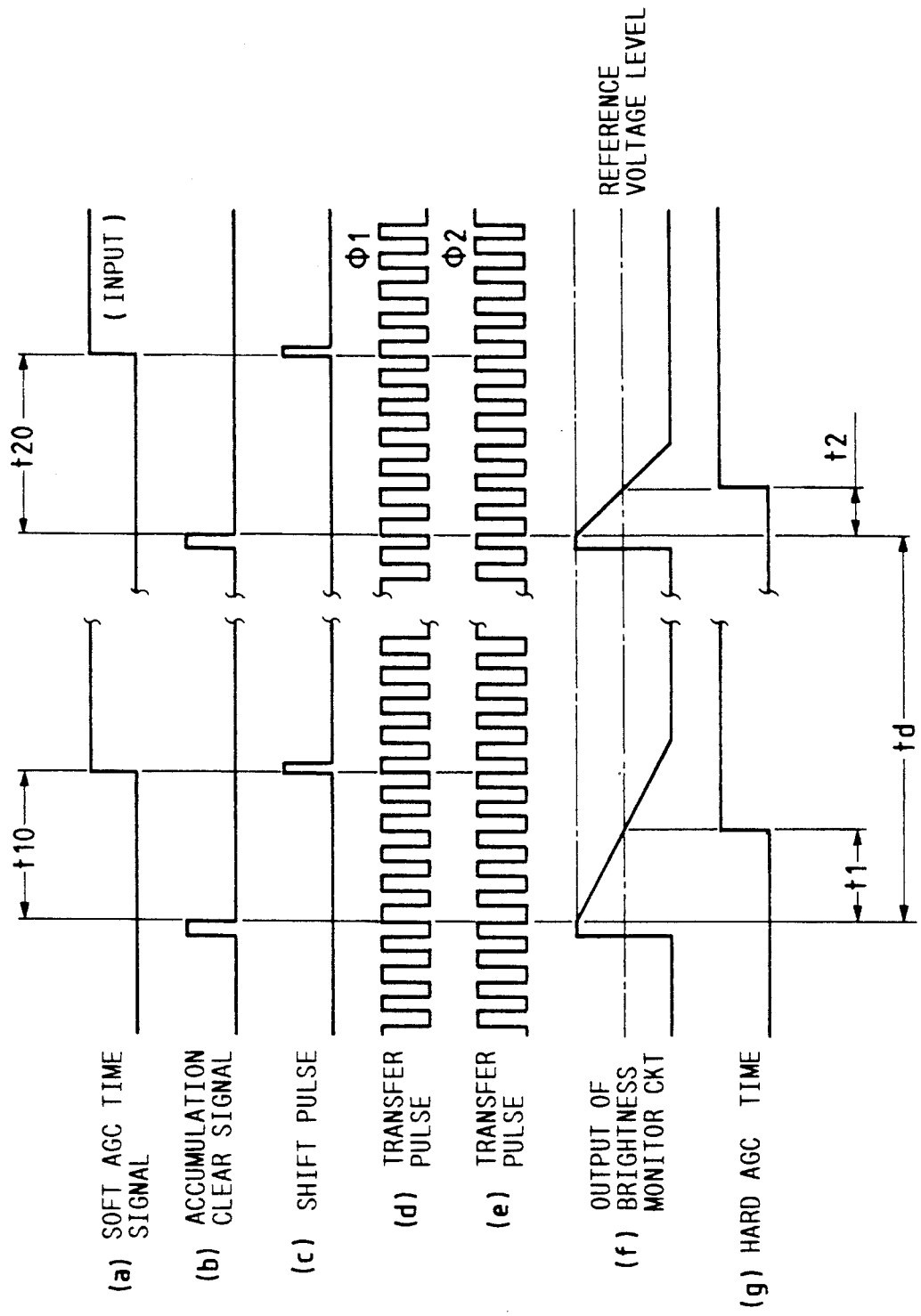
FIG. 3 shows the waveforms of the individual signals used in the operation of the photoelectric transfer means of FIG. 2.

The above-described operation is illustrated in FIG. 3. In FIG. 3, t10 indicates the charge accumulation time for the first charge accumulation operation, t1 is the hard auto gain control time for the first charge accumulation operation, t20 is the charge accumulation time for the second charge accumulation operation, t2 is the hard auto gain control time for the second charge accumulation operation, and td represents the time difference between the beginning of the first charge accumulation operation and the beginning of the second charge accumulation operation. In the example shown in FIG. 3, the brightness of the object obtained in the second charge accumulation operation is twice that of the first charge accumulation operation.

The hard auto gain control time t2 obtained in the second charge accumulation operation is half of the hard auto gain control time t1 obtained in the first charge accumulation operation. Using the hard auto gain control time for the first charge accumulation operation, the hard auto gain control time for the second charge accumulation operation, the charge accumulation time for the second charge accumulation time, and the values obtained by separately converting the pixel signals obtained in the second charge accumulation operation into digital signals, the accurate photometric value relative to the average brightness of the object is obtained.

The method of obtaining the photometric value using the above data will be explained below in detail. The photometric value is calculated from the output of the focal point detecting device constructed by the charge accumulation type photoelectric transfer elements as follows:

$$B = A \times S / T \quad (1)$$

where B is the brightness of the object, A is the constant, S is the pixel output accumulated value, and T is the accumulation time.

Figure 4:
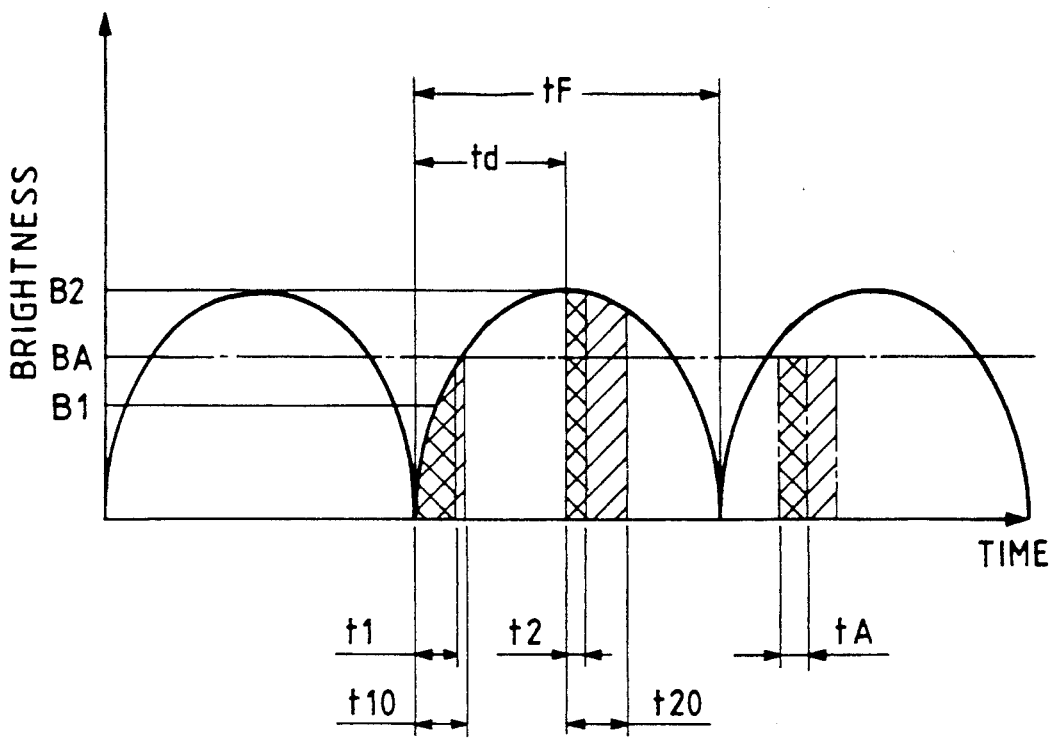
FIG. 4 shows the charge accumulation operation conducted under a flickering light source.

FIG. 4 shows charge accumulation operations under a flickering light source. The method of obtaining the photometric value will be described below with reference to FIG. 4.

Assuming that the charge accumulation time for the second charge accumulation operation is t20 and the accumulated value of the A/D converted values of the outputs of the individual pixels in the second charge accumulation operation is S2, as in the case shown in FIG. 3, the brightness B2 of the object for the second charge accumulation operation is given by:

$$B2 = A \times S2 / T20 \quad (2)$$

The brightness of the object obtained in the second charge accumulation operation may be higher or lower than the average brightness due to the influence of flickering. Hence, B2 calculated by equation (2) may not be an accurate average brightness of the object. Since the time difference td between the beginnings of the first and second charge accumulation operations is substantially an odd multiple of half of the flickering period of the light source, a hard auto gain control time tA in an average object brightness state is regarded as the geometrical mean of the hard auto gain control time t1 for the first charge accumulation operation and the hard auto gain control time t2 for the second charge accumulation operation, and is given by:

$$tA = SQRT(t1 \times t2) \quad (3)$$

The hard auto gain control time t2 for the second charge accumulation operation is short when the object brightness obtained in the second charge accumulation operation is higher than the average value and is long when the object brightness is lower.

The relationship expressed by the following equation is established between the average object brightness BA, the hard auto gain control time tA in the average object brightness state, the object brightness B2 obtained in the second charge accumulation operation and the hard auto gain control time t2 for the second charge accumulation operation.

$$BA \times tA = B2 \times t2 \quad (4)$$

Transforming equation (4) and inserting equations (3) and (2) in equation (4), we have $$BA = A \times (S2/t20) \times \{t2/SQRT(t1 \times t2)\} \quad (5)$$

In the present invention, it is thus possible to obtain an accurate photometric value relative to the average object brightness from the two charge accumulation operations conducted when the photometric apparatus is in operation. Furthermore, the operations require less number of parameters, and less capacity of memory.

Figure 5:
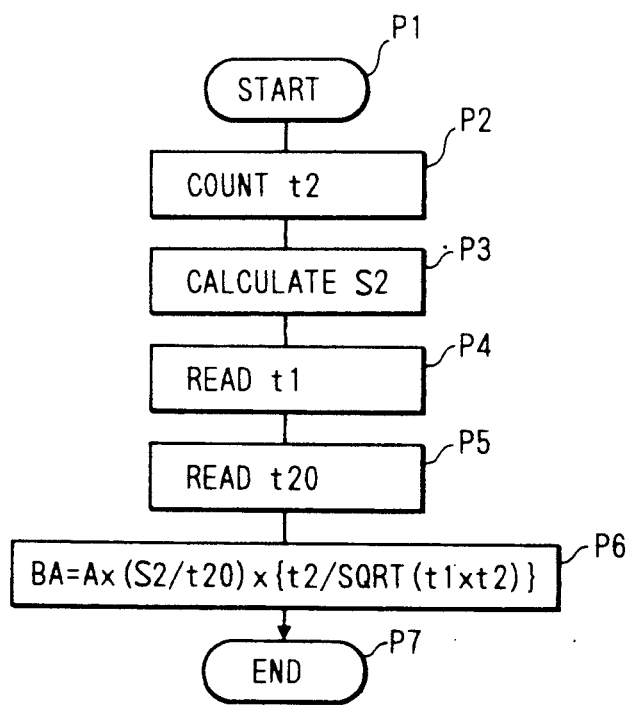
FIG. 5 is a flowchart showing the algorithm of the photometric value calculation.

FIG. 5 shows the algorithm of the above-described calculation of the photometric value. First, the process starts in step P1, and then the hard auto gain control time t2 is counted in step P2. After the charge accumulation operation is completed, the accumulated value S2 of the A/D converted values of the outputs of the individual pixels obtained in the present charge accumulation operation is calculated in step P3.

Next, the hard auto gain control time t1 for the previous charge accumulation operation is input from the memory means in step P4, and the soft auto gain control time t20 for the present charge accumulation operation, determined by the results of the previous charge accumulation operation, is input in step P5.

Thereafter, the photometric value BA is calculated using equation (5) in step P6, and then the process is completed in step P7. The photometric value is obtained from the A/D converted values of the outputs of the individual pixels (the accumulated value of the A/D converted values in this embodiment) using the hard auto gain control time data as the correction coefficient. Therefore, the above-described photometric value is equivalent to the value obtained by metering the brightness of the object by means of the light-receiving portions of the photoelectric transfer element groups. Hence, the metering accuracy is high.

The photoelectric transfer means of the photometric apparatus is driven under the soft auto gain control. However, the charge accumulation condition can be quickly changed appropriately by means of the real time monitor means when the brightness of the object changes rapidly. That is, when the hard auto gain control is adjusted to a value shorter than the soft auto gain control time at a predetermined rate (for example, half of the soft auto gain control time) under the condition of a constant light, the hard auto gain control time may be up at a time far shorter than half of the soft auto gain control time calculated from the results of the previous charge accumulation operation (for example, in a time which is one quarter of the soft auto gain control time). In that case, since there is the possibility that the brightness of the object is twice that of the previous operation or above, charge accumulation may be suspended before the soft auto gain control time is up at a time which is equal to 2× the hard auto gain control time. In this way, saturation of the output of the photoelectric transfer means can be avoided.

In a reverse case, that is, when the hard auto gain control time is not up at a time when the soft auto gain control time is completed, since there is the possibility that the brightness of the object is half of that obtained in the previous charge accumulation operation or below, charge accumulation is continued even after the soft auto gain control time is up: it is completed when the hard auto gain control time is up. In this way, an extremely low output can be avoided.

Figure 6:
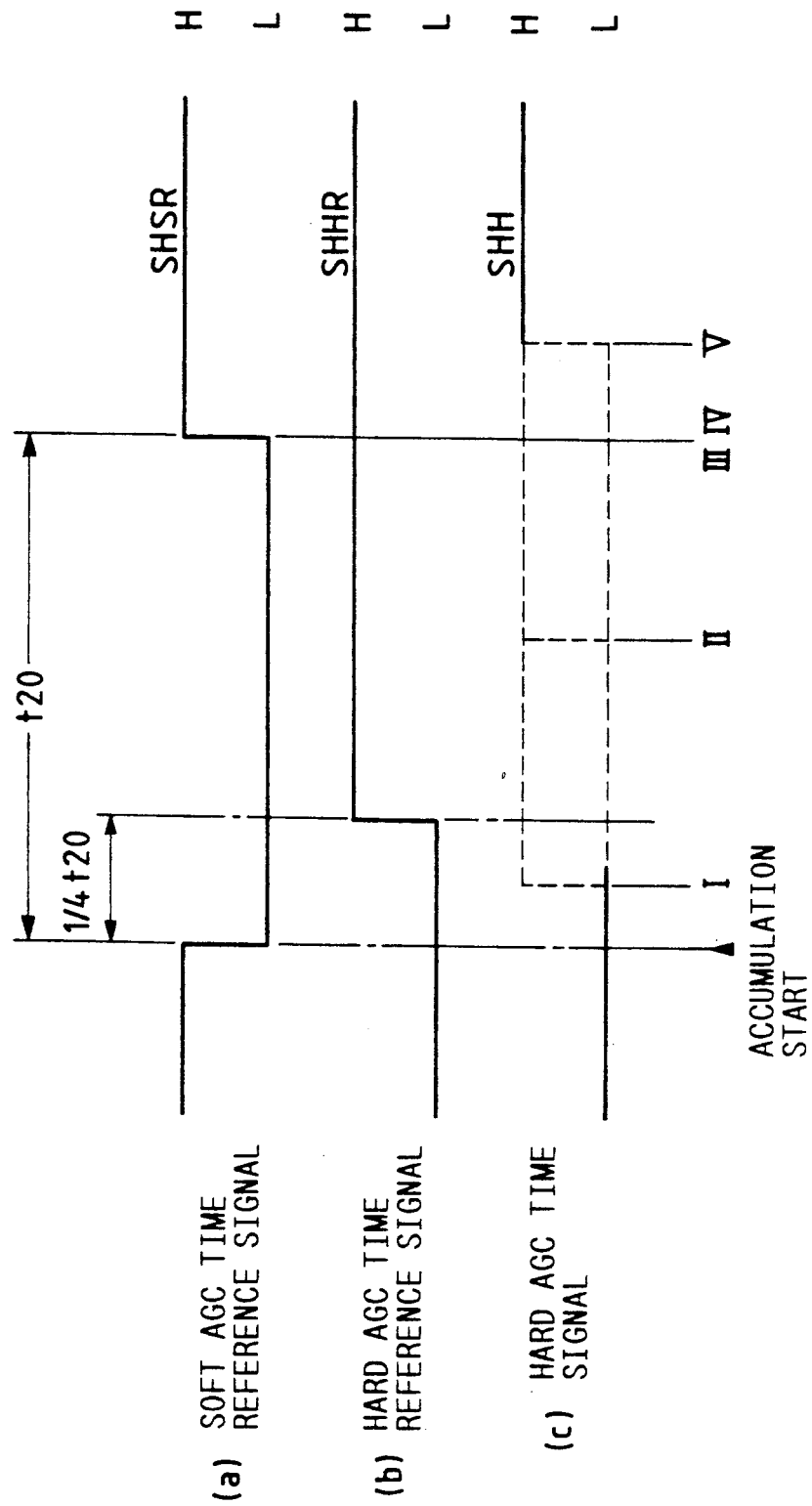
FIG. 6 shows the waveforms of the individual signals used in the operation of a modification of the embodiment of FIG. 1.

FIG. 6 shows an example in which the above-described embodiment is applied. Table 1 shows the algorithm with which the photometric arithmetic means calculates the time at which the soft auto gain control time signal (SHS) is input after the charge accumulation operation is started using a hard auto gain control reference signal (SHHR) which varies at a time which is ¼× the soft auto gain control time, a soft auto gain control time reference signal (SHSR) which varies at the soft auto gain control time t20, and a hard auto gain control time signal (SHH).

TABLE 1

|     | SHH  | SHHR | SHSR | SHS                        |
|-----|------|------|------|----------------------------|
| I   | L→H  | L    | L    | Turned on at Count (t2) × 2 |
| II  | L→H  | H    | L    | (queuing)                  |
| III | L    | H    | L→H  | (queuing)                  |
| IV  | H    | H    | L→H  | On                         |
| V   | L→H  | H    | H    | On                         |

When control of the photometric apparatus is altered such that the hard auto gain control time is treated more important, it is desirable that the rate be set with a margin because the light-receiving elements of the real-time monitor of the hard auto gain control and the photoelectric transfer elements do not meter the same area and because the light-receiving area of the monitor element is small and output thereof becomes unstable easily, as stated above.

In the above-described example, a predetermined time rate is used as the reference with which control of the photometric apparatus is changed such that the hard auto gain control time is treated more important. That reference may be altered. That is, the ratio between the soft auto gain control time and the hard auto gain control which is learned in the previous charge accumulation operations by the learning function may be used as the reference with which control is altered.

Practically, the time at which the hard auto gain control reference signal (SHHR) shown in FIG. 6 varies may be adjusted. Furthermore, when the drive of the photometric apparatus begins and when the output of the previous charge accumulation operation cannot therefore be obtained, the photometric arithmetic means may send to the interface circuit $5_4$ may send the soft auto gain control time signal (SHS) after a time which is a multiple of the counted value of the hard auto gain control time has elapsed to start the drive of the photometric apparatus.

A second embodiment of the present invention will be described below with reference to FIGS. 7 to 11.

Figure 7:
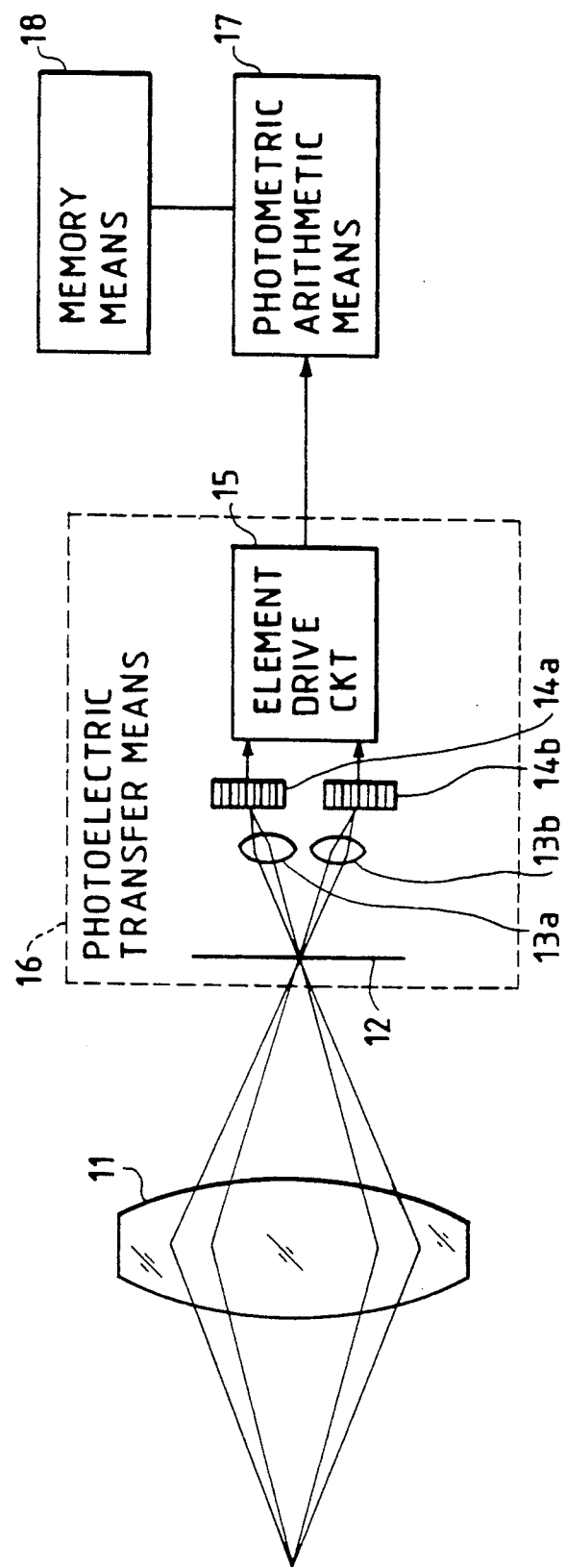
FIG. 7 is a schematic block diagram of a second embodiment of the present invention.

Referring first to FIG. 7, reference numeral 11 denotes a photographic lens; 12, a film equivalent surface; 13a and 13b, lenses for forming an image; 14a and 14b, photoelectric transfer element groups; 15, an element drive circuit; 16, a photoelectric transfer means; 17, a photometric arithmetic means; and 18, a memory means. The components including the photographic lens 11, the film equivalent surface 12, the image forming lenses 13a and 13b and the photoelectric transfer element groups 14a and 14b form part of a known focal point detection device. However, the photometric apparatus of the present invention may be provided separately from the focal point detection device. The photometric apparatus of this invention is not related to the focal point detecting device.

In the photoelectric transfer means 16, an image of an area on the film equivalent surface 12 is separately formed on the photoelectric transfer element groups 14a and 14b by the image forming lenses 13a and 13b. In a focused state, the photoelectric transfer element groups 4a and 4b meter the same area.

Figure 8:
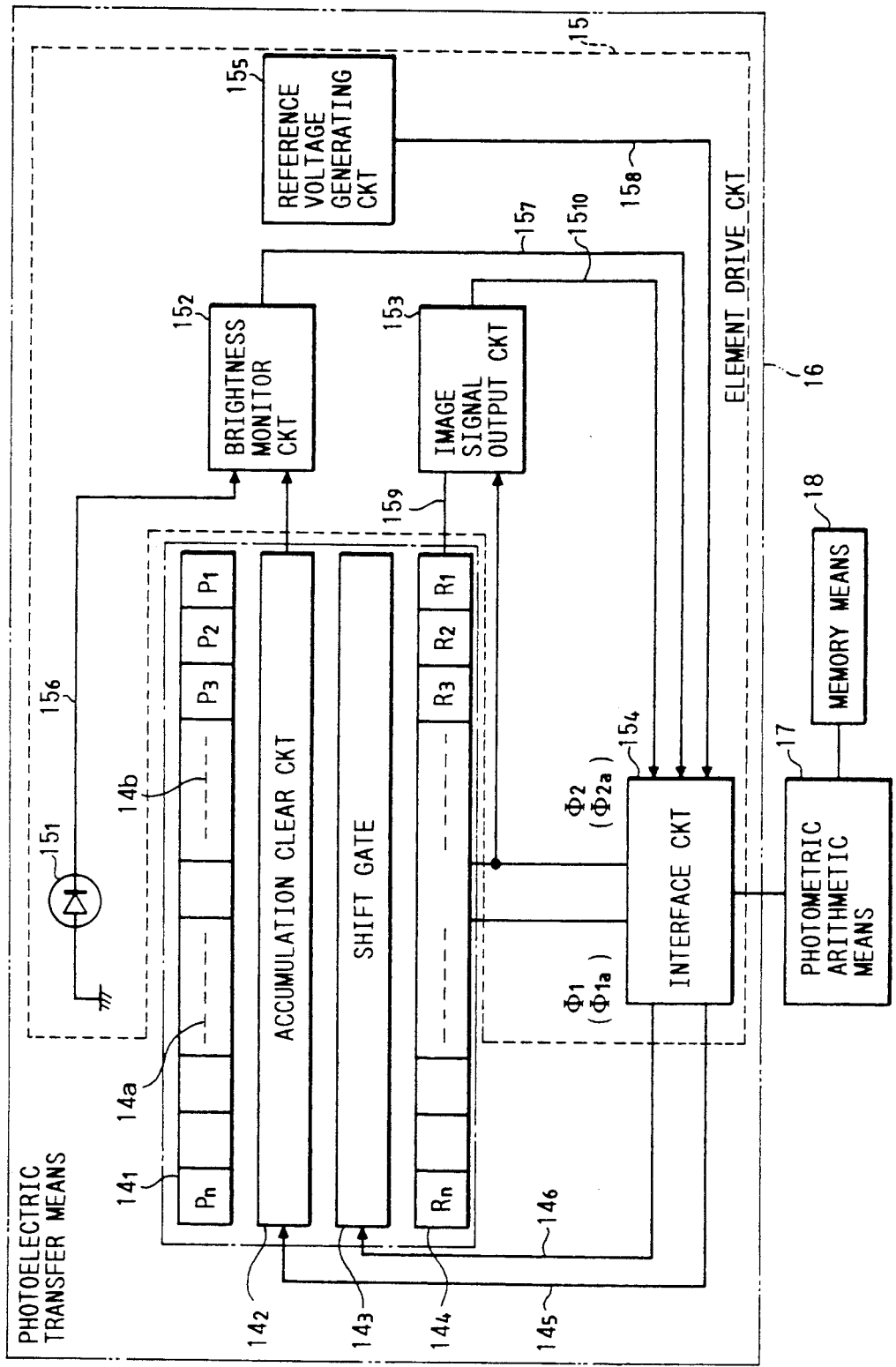
FIG. 8 is a block diagram of the photoelectric transfer means of FIG. 7.

FIG. 8 shows the structure of the photoelectric transfer means 16 of FIG. 7. The photoelectric transfer means 16 includes a photo sensor array $14_1$ consisting of elements Pl to Pn, an accumulation clear circuit $14_2$ for initializing (resetting) the photo sensor array $14_1$, a shift gate $14_3$ for transferring the charge accumulated in the photo sensor array $14_1$ to a CCD shift register $14_4$ consisting of elements Rl to Rn, and a brightness monitor light-receiving element $15_1$ provided close to the photo sensor array $14_1$ and having the same length as and a smaller area than the photo sensor array $14_1$.

The right half of the photo sensor array $4_1$ corresponds to the photoelectric transfer element group 4b shown in FIG. 7 while the left half thereof corresponds to the photoelectric transfer element group 4a shown in FIG. 7.

The operation of the photoelectric transfer means 16 will be described below. Once the power is turned on, the first charge accumulation operation is conducted. In the first charge accumulation operation, an accumulation clear signal $14_5$ is first sent from the interface circuit $15_4$ to an accumulation clear circuit $14_2$. When the transmission of the accumulation clear signal $14_5$ is completed, the individual photo sensors in the photo sensor array $14_1$ start accumulating a charge at a speed corresponding to the brightness of the object.

The hard auto gain control (the function of determining the photometric time using the data detected by the brightness monitor light-receiving element $15_1$ is defined as the hard auto gain control) is conducted by the brightness monitor light-receiving element $15_1$ and an output $15_7$ of the brightness monitor circuit $15_2$. After transmission of the accumulation clear signal $14_5$ is completed, the voltage of the output signal $15_7$ of the brightness monitor circuit $15_2$ falls rapidly when the light current of the brightness monitor light receiving element $15_1$, corresponding to the brightness of the object, is bright, and falls slowly when the light current is dark.

The interface circuit $15_4$ compares the output signal $15_7$ of the brightness monitor circuit $15_2$ with the reference voltage $15_8$ which is the output of the reference voltage generating circuit $15_5$, and outputs a shift pulse $14_6$ to the shift gate $14_3$ when both voltages equal. When the shift pulse $14_6$ is input to the shift gate $14_3$, the charge accumulated in the photo sensor array $14_1$ is transferred to the CCD shift register $14_4$.

The photometric arithmetic means 17 counts the time interval between the end of the accumulation clear signal $14_3$ and the generation of the shift pulse $14_6$, and stores the counted time in the memory means 18 as the hard auto gain control time for the first charge accumulation operation. Thereafter, the image signal output circuit $15_3$ processes an image signal $15_9$ obtained by a transfer pulse $\phi 1a$ and a transfer pulse $\phi 2a$ which is 180° out of phase with the transfer pulse $\phi 1a$, generated by the interface circuit $15_4$, and outputs a resultant pixel signal $15_{10}$.

In this embodiment, since the pixel signal for the first charge accumulation operation needs not be converted into a digital signal, the time required for the microcomputer constituting the photometric arithmetic means 7 to convert the pixel signal into a digital signal needs not be taken into consideration. Hence, high-frequency transfer pulses $\phi 1a$ and $\phi 2a$ can be used, and the charge can thus be transferred from the CCD shift register 144 at a very high speed.

When a predetermined period of time has elapsed since the beginning of the first charge accumulation operation, practically, when a time corresponding to half of the flickering period has elapsed, and after the charge has been transferred from the CCD shift register $14_4$, the second charge accumulation operation begins. The second charge accumulation operation is conducted substantially in the same manner as the first charge accumulation operation to store the hard auto gain control time for the second charge accumulation operation in the memory means.

In the second charge accumulation operation, the time required for the microcomputer forming the photometric arithmetic means 17 to convert the pixel signal into a digital signal is taken into consideration, and transfer pulses $\phi 1$ and $\phi 2$ having a lower frequency than the high-frequency transfer pulses $\phi 1a$ and $\phi 2a$ are thus used. The photometric arithmetic means 17 converts the pixel signals $15_{10}$ output from the image signal output circuit $15_3$ into digital signals in sequence, and stores the obtained signals in the memory means 18. The above-described operation is illustrated in FIG. 9.

Figure 9:
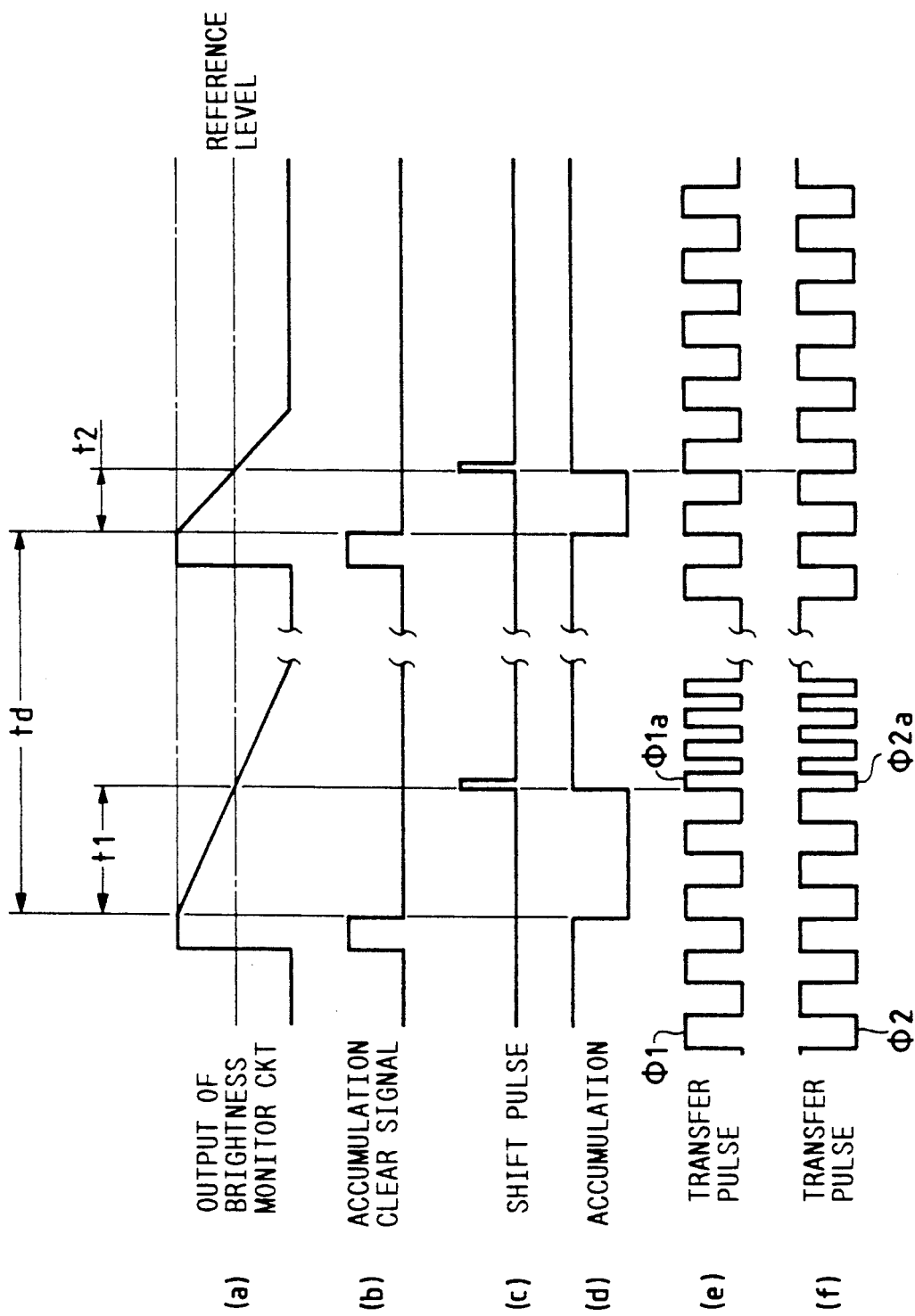
FIG. 9 shows the waveforms of the individual signals used in the operation of the photoelectric transfer means of FIG. 8.

In FIG. 9, t1 indicates the hard auto gain control time for the first charge accumulation operation, t2 is the hard auto gain control time for the second charge accumulation operation, and td represents the time difference between the beginning of the first charge accumulation operation and the beginning of the second charge accumulation operation. In the example shown in FIG. 9, the brightness of the object obtained in the second charge accumulation operation is twice that of the first charge accumulation operation. As stated above, the hard auto gain control time t2 for the second charge accumulation operation is half of the hard auto gain control time for the first charge accumulation operation because of the difference in the brightness.

Using the hard auto gain control time for the first charge accumulation operation, the hard auto gain control time for the second charge accumulation operation, and the values obtained by separately converting the pixel signals obtained in the second charge accumulation operation into digital signals, the accurate photometric value relative to the average brightness of the object is obtained.

The method of obtaining the photometric value using the above three types of data will be explained below in detail. As stated above, the photometric value is calculated from the output of the focal point detecting device constructed by the charge accumulation type photoelectric transfer elements as follows:

$$B = A \times S/T \tag{6}$$

where B is the brightness of the object, A is the constant, S is the pixel output accumulated value, and T is the accumulation time.

Figure 10:
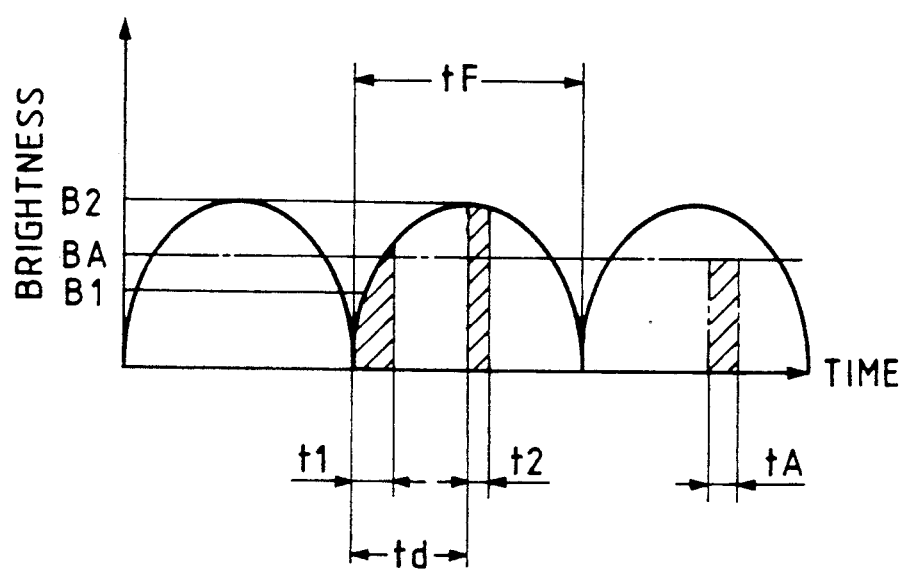
FIG. 10 shows the charge accumulation operation conducted under a flickering light source.

FIG. 10 shows charge accumulation operations under a flickering light source. The method of obtaining the photometric value will be described below with reference to FIG. 10.

Assuming that the hard auto gain control time for the first charge accumulation operation is t1, the hard auto gain control time for the second charge accumulation operation is t2, the accumulated value of the A/D converted values of the outputs of the individual pixels in the second charge accumulation operation is S2, since the accumulated value of the pixel outputs is obtained in the second charge accumulation operation, the brightness of the object is obtained by obtaining the brightness B2 of the object for the second charge accumulation operation as follows:

$$B2 = A \times S2/t2 \tag{7}$$

The brightness of the object obtained in the second charge accumulation operation may be higher or lower than the average brightness due to the influence of flickering. Hence, B2 calculated by equation (7) may not be an accurate average brightness of the object.

Since the time difference td between the beginnings of the first and second charge accumulation operations is substantially an odd multiple of half of the flickering period F of the light source, a hard auto gain control time tA in an average object brightness state is regarded as the geometrical mean of the hard auto gain control time t1 for the first charge accumulation operation and the hard auto gain control time t2 for the second charge accumulation operation, and is given by:

$$tA = SQRT(t1 \times t2) \tag{8}$$

where SQRT indicates the square root operation.

The hard auto gain control time t2 for the second charge accumulation operation is short when the object brightness obtained in the second charge accumulation operation is higher than the average value and is long when the object brightness is lower.

The relationship expressed by the following equation is established between the average object brightness BA, the hard auto gain control time tA in the average object brightness state, the object brightness B2 obtained in the second charge accumulation operation and the hard auto gain control time t2 for the second charge accumulation operation.

$$BA \times tA = B2 \times t2 \tag{9}$$

Transforming equation 9 and inserting equations (8) and (7) in equation (9), we have $$\begin{aligned} BA &= A \times (S2/t2) \times \{t2 / SQRT(t1 \times t2)\} \\ &= A \times \{S2 / SQRT(t1 \times t2)\} \ldots \end{aligned} \tag{10}$$

In the present invention, it is thus possible to obtain an accurate photometric value relative to the average object brightness from the two charge accumulation operations conducted when the photometric apparatus is in operation. Since the photometric value is obtained using not only the hard auto gain control time data but also the A/D converted values of the outputs of the individual pixels (in this embodiment, the accumulated value thereof), it is equivalent to the photometric value obtained by the light-receiving portion of the photo sensor array $14_1$ having a larger area than the brightness monitor light-receiving element $15_1$, as stated above, and thus has a high degree of accuracy.

Furthermore, when the individual pixel signals obtained in the first charge accumulation operation are output, they are not A/D converted. Consequently, an accurate photometric value can be obtained at an early time after the operation of the photometric apparatus is started, and the photometric time lag which adversely affects the quick photography of the camera can thus be eliminated. When an object having a very low brightness is metered, the charge accumulation time of the photoelectric transfer means in the first charge accumulation operation may be as long as the flickering period of the light source. In that case, the pixel output obtained in the first charge accumulation operation is considered to represent the average object brightness in whatever timing that pixel output is obtained with respect to a flicker. That is, because of the long charge accumulation time, whether the photometric operation is conducted at the crest or trough of a flicker does not matter any more.

Consequently, if the hard auto gain control time for the first charge accumulation operation is longer than a predetermined time (for example, flickering period ×0.8), the photometric arithmetic means 17 sends a low-speed drive signal to the interface circuit $15_4$, converts the pixel outputs into digital signals using the transfer pulses $\phi 1$ and $\phi 2$, and stores the A/D converted values in the memory means 18. The photometric arithmetic means 17 also stores the obtained hard auto gain control time in the memory means 18. In that case, since there is only one hard auto gain control time, the photometric value can be obtained using the equation (6) by the single charge accumulation operation conducted when the photometric apparatus is in operation.

Figure 11:
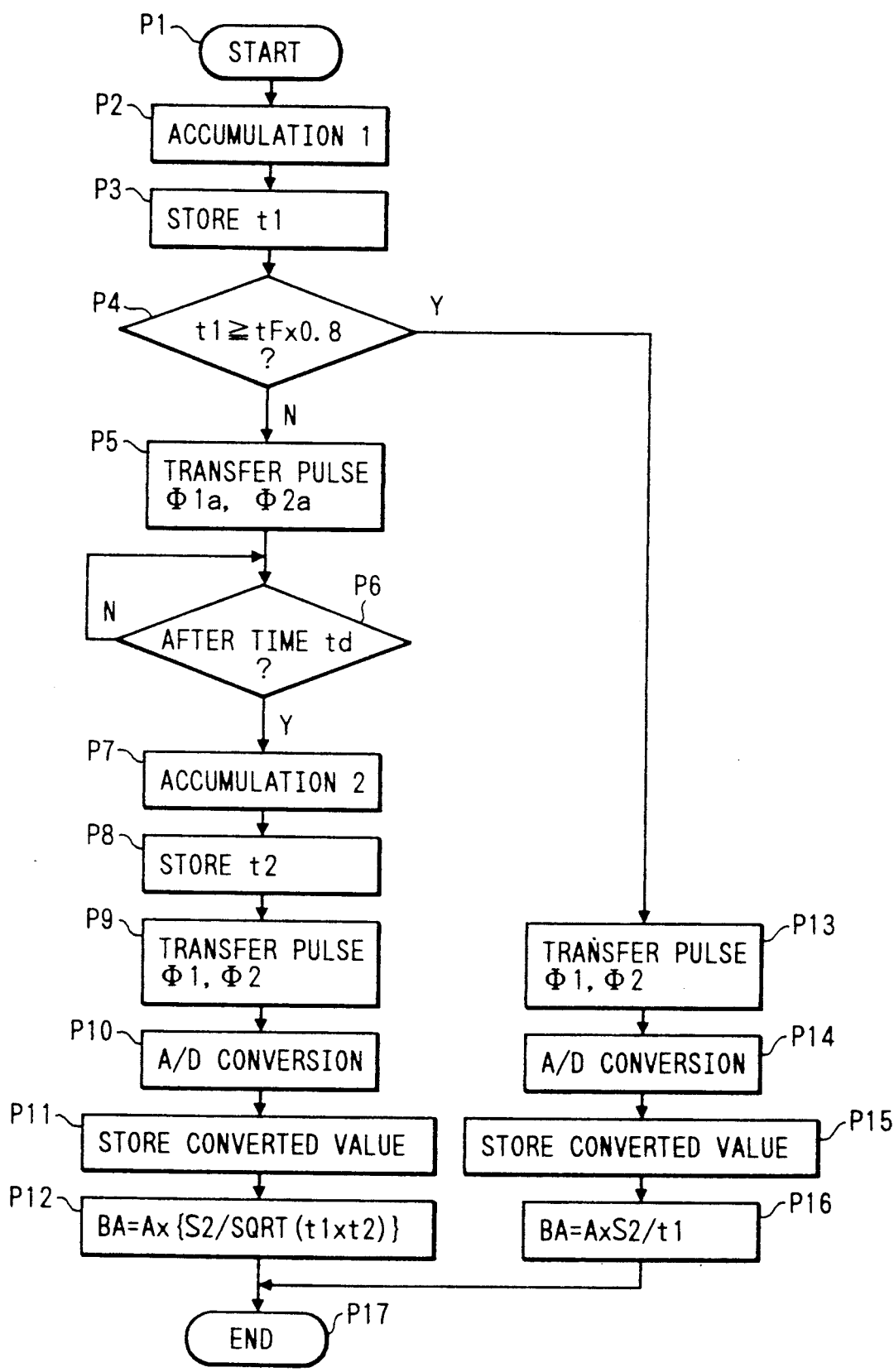
FIG. 11 is a flowchart showing the algorithm of the photometric value calculation conducted in the second embodiment.

FIG. 11 shows the algorithm of the aforementioned photometric calculation. First, the process starts in step P1, and the first charge accumulation operation is conducted in step P2. After the charge accumulation operation is completed, the hard auto gain control time t1 for the first charge accumulation operation is stored in step P3. Next, it is determined in step P4 whether or not the hard auto gain control time t1 for the first charge accumulation time is longer than a predetermined time, i.e., flickering period tF×0.8. This predetermined time may also be determined by a learning function which automatically corrects the predetermined value using variations in the photometric value calculated in the previous operations.

If it is determined that the hard auto gain control time t1 is longer than the flickering period tF×0.8, the process goes to step P5 and the accumulated charge is transferred at a high speed by the high-frequency transfer pulses φ1a and φ2a. Next, it is determined in step P6 whether or not a predetermined time difference td, which is substantially an odd multiple of half of the flicker period of the light source, has passed since the first charge accumulation operation started. If the predetermined time td passes, the step goes to step P7.

In step P7, the second charge accumulation operation is conducted. After the charge accumulation operation is completed, the hard auto gain control time t2 for the second charge accumulation operation is stored in step P8. Next, the accumulated charge is transferred by the low-frequency transfer pulses φ1 and φ2 in step P9, the outputs of the individual pixels are converted into digital data in step P10, and the obtained data is stored in step P11 (in an actual operation, the processes from step P9 to step P11 are executed concurrently with each other).

Next, in step P12, the photometric value BA is calculated using equation (10), and the operation cycle ends in step P17.

If the hard auto gain control time t1 is longer than the time which is flicker period tF×0.8, the process goes from step P4 to step P13, and the accumulated charge is transferred by the low-frequency transfer pulses φ1 and φ2 in step P13. Thereafter, the outputs of the individual pixels are converted into digital data in sequence in step P14, and the obtained digital data is stored in step P15 (in an actual operation, the processes from step P13 to P15 are executed concurrently with each other). Next, the photometric value BA is calculated using the equation (6) in step P16, and then the process is ended in step P17.

In this embodiment, although necessary data can be obtained by executing two charge accumulation operations, when a relatively bright object is metered, A/D conversion for the first charge accumulation operation can be omitted. Hence, the measuring time can be further reduced. Cameras which are available on the market in recent years are designed such that power is switched off so as to suppress consumption when the camera is not operated about consecutive sixteen seconds. The camera is switched on by a subsequent action. At that time, if the photometric value is obtained by conducting four charge accumulation operations, a shutter release opportunity may not be made use of. In the photometric apparatus according to the present invention, the photometric value can be obtained by conducting two charge accumulation operations in one of which A/D conversion is omitted. Consequently, the processing time can be reduced greatly by a value corresponding to two charge accumulation operations plus the time required for the A/D conversion in one charge accumulation operation.

What is claimed is:

1. A photometric apparatus comprising:
    a charge accumulation type photoelectric transfer means having a plurality of pixels;
    a real time monitor means for monitoring the intensity of incident light in a charge accumulation time of said photoelectric transfer means;
    a counting means for counting a time required for the output of said real time monitor means to reach a predetermined threshold value;
    a memory means for storing the counted value of said counting means; and
    an operation means for calculating a brightness of an object using the previously counted value stored in said memory means, the presently counted value, the present charge accumulation time, and the A/D converted values of the individual pixel signals obtained on the basis of the present charge accumulation of said photoelectric transfer means.

2. The photometric apparatus according to claim 1, wherein the time interval between the adjacent charge accumulation starting times is substantially an odd multiple of half of the flickering period of a light to be metered.

3. The photometric apparatus according to claim 1, wherein the time required for the output of said real time monitor means to reach the predetermined threshold value under a constant light is set to a value which is shorter than the charge accumulation time of said photoelectric transfer means by a predetermined rate.

4. A photometric apparatus comprising:
    an auto gain control type charge accumulation photoelectric transfer means for setting a present charge accumulation time on the basis of the previous accumulation results;
    a real time monitor means for monitoring the intensity of incident light in the charge accumulation time of said photoelectric transfer means;
    a counting means for counting a time required for the output of said real time monitor means to reach a predetermined threshold value;
    a memory means for storing the counted value of said counting means; and
    an operation means for calculating a brightness of an object using the previously counted value stored in said memory means, the presently counted value, the present charge accumulation time, and the A/D converted values of the individual pixel signals obtained on the basis of the present charge accumulation of said photoelectric transfer means,
    wherein the time required for the output of said real time monitor means to reach the predetermined threshold value under a constant light is set to a value which is shorter than the charge accumulation time of said photoelectric transfer means by a predetermined rate, and wherein when the time required for the output of said real time monitor means to reach the predetermined threshold value is a predetermined small percentage of the charge accumulation time of said photoelectric transfer means x the predetermined rate or less, charge accumulation of said photoelectric transfer means is suspended at a time which is a predetermined integral multiple of the time required for the output to reach the predetermined threshold value and which is smaller than the charge accumulation time.

5. The photometric apparatus according to claim 4 wherein said predetermined rate is ½.

6. The photometric apparatus according to claim 4, wherein said predetermined small percentage is ½.

7. The photometric apparatus according to claim 4, wherein said predetermined integral multiple is 2.

8. The photometric apparatus according to claim 4, wherein said predetermined rate can be altered by a learning function.

9. The photometric apparatus according to claim 4, wherein the charge accumulation time of said photoelectric transfer means for the charge accumulation operation conducted the first time after the drive of the photometric apparatus is started is set to a value obtained by multiplying a predetermined value to the time required for the output of said real time monitor means to reach the predetermined threshold value.

10. A photometric apparatus comprising:
an auto gain control type charge accumulation photoelectric transfer means for setting a present charge accumulation time on the basis of the previous accumulation results;
a real time monitor means for monitoring the intensity of incident light in the charge accumulation time of said photoelectric transfer means;
a counting means for counting a time required for the output of said real time monitor means to reach a predetermined threshold value;
a memory means for storing the counted value of said counting means; and
an operation means for calculating a brightness of an object using the previously counted value stored in said memory means, the presently counted value, the present charge accumulation time, and the A/D converted values of the individual pixel signals obtained on the basis of the present charge accumulation of said photoelectric transfer means,
wherein when the output of said real time monitor means does not reach the predetermined threshold value even after the set charge accumulation time passes, charge accumulation of said photoelectric transfer means is continued until the output of said real time monitor means reaches the predetermined threshold value.

11. The photometric apparatus according to claim 10, wherein said predetermined rate can be altered by a learning function.

12. A photometric apparatus comprising:
a photoelectric transfer means having a plurality of pixels, said photoelectric transfer means being capable of outputting at a high speed the outputs of the individual pixels obtained by a first charge accumulation operation conducted immediately after the photometric apparatus is switched on without A/D conversion and of starting a second charge accumulation operation when a predetermined time passes after the first charge accumulation operation is started;
a real time monitor means for monitoring the intensity of incident light in a charge accumulation time of said photoelectric conversion means on a real time basis;
a counting means for counting a time for the output of said real time monitor means to reach a predetermined threshold value;
a memory means for storing the counted value counted by said counting means in the first charge accumulation operation, the counted value obtained in the second charge accumulation operation, A/D converted values of the outputs of the individual pixels of said photoelectric transfer means obtained in the second charge accumulation operation; and
a operation means for calculating an brightness of an object on the basis of the data stored in said memory means.

13. The photometric apparatus according to claim 12, wherein the predetermined time between the beginning of the first charge accumulation operation and the beginning of the second charge accumulation operation is an odd multiple of half of a flickering period of a light to be metered.

14. The photometric apparatus according to claim 12, wherein when the charge accumulation time for the first charge accumulation operation is longer than a predetermined time, the outputs of the individual pixels are output with A/D conversion.

15. The photometric apparatus according to claim 14, wherein said predetermined time is $tF \times 0.8$, where tF is the flickering period of the light to be metered.

16. The photometric apparatus according to claim 14, wherein said predetermined time is a variable which can be automatically corrected by a learning function.

17. The photometric apparatus according to claim 12, wherein said memory means stores a value obtained by accumulating the A/D converted values of the outputs of the individual pixels obtained in the second charge accumulation.

18. The photometric apparatus according to claim 12, wherein part of the means included in said apparatus is used as part of a focal point detecting device.

19. The photometric apparatus according to claim 12, further comprising a means for generating transfer pulses used to take out the accumulated charge as an image signal, the transfer pulses $\phi 1a$ and $\phi 2a$ generated after the first charge accumulation have a higher frequency than the transfer pulses $\phi 1$ and $\phi 2$ generated after the second charge accumulation and than the A/D conversion speed.

20. A photometric apparatus comprising:
time counting means for repeatedly counting a time required for a charge accumulated by photoelectric transfer means to reach a predetermined value;
light quantity measuring means for measuring, each time said charge accumulated by the photoelectric transfer means reaches the predetermined value, light quantity on the basis of charge accumulation till that time; and
calculation means for calculating brightness of an object on the basis of a first time required for the charge accumulated by the photoelectric transfer means to reach the predetermined value, a second time required for the charge accumulated by the photoelectric transfer means to reach the predetermined value, and the light quantity measured by said light quantity measuring means the second time the charge accumulated by the photoelectric transfer means reaches the predetermined value.

21. A photometric apparatus comprising:
a charge accumulation type photoelectric transfer means having a plurality of pixels;
a real time monitor means for monitoring the intensity of incident light in a charge accumulation time of said photoelectric transfer means;
a counting means for counting a time required for the output of said real time monitor means to reach a predetermined threshold value;
a memory means for storing the counted value of said counting means; and
an operation means for calculating a brightness of an object using the previously counted value stored in said memory means, the presently counted value, the present charge accumulation time, and the individual pixel signals obtained on the basis of the present charge accumulation of said photoelectric transfer means.

22. The photometric apparatus according to claim 21, wherein the time interval between the adjacent charge accumulation starting times is substantially an odd multiple of half of the flickering period of a light to be metered.

23. The photometric apparatus according to claim 21, wherein the time required for the output of said real time monitor means to reach the predetermined threshold value under a constant light is set to a value which is shorter than the charge accumulation time of said photoelectric transfer means by a predetermined rate.

24. A photometric apparatus comprising:
an auto gain control type charge accumulation photoelectric transfer means for setting a present charge accumulation time on the basis of the previous accumulation results;
a real time monitor means for monitoring the intensity of incident light in the charge accumulation time of said photoelectric transfer means;
a counting means for counting a time required for the output of said real time monitor means to reach a predetermined threshold value;
a memory means for storing the counted values of said counting means; and
an operation means for calculating a brightness of an object using the previously counted value stored in said memory means, the presently counted value, the present charge accumulation time, and the individual pixel signals obtained on the basis of the present charge accumulation of said photoelectric transfer means,
wherein the time required for the output of said real time monitor means to reach the predetermined threshold value under a constant light is set to a value which is shorter than the charge accumulation time of said photoelectric transfer means by a predetermined rate, and wherein when the time required for the output of said real time monitor means to reach the predetermined threshold value is a predetermined small percentage of the charge accumulation time of said photoelectric transfer means × the predetermined rate of less, charge accumulation of said photoelectric transfer means is suspended at a time which is a predetermined integral multiple of the time required for the output to reach the predetermined threshold value and which is smaller than the charge accumulation time.

25. The photometric apparatus according to claim 24 wherein said predetermined rate is ½.

26. The photometric apparatus according to claim 24, wherein said predetermined small percentage is ½.

27. The photometric apparatus according to claim 24, wherein said predetermined integral multiple is 2.

28. The photometric apparatus according to claim 24, wherein said predetermined rate can be altered by a learning function.

29. The photometric apparatus according to claim 24, wherein the charge accumulation time of said photoelectric transfer means for the charge accumulation operation conducted the first time after the drive of the photometric apparatus is started is set to a value obtained by multiplying a predetermined value to the time required for the output of said real time monitor means to reach the predetermined threshold value.

30. A photometric apparatus comprising:
an auto gain control type charge accumulation photoelectric transfer means for setting a present charge accumulation time on the basis of the previous accumulation results;
a real time monitor means for monitoring the intensity of incident light in the charge accumulation time of said photoelectric transfer means;
a counting means for counting a time required for the output of said real time monitor means to reach a predetermined threshold value;
a memory means for storing the counted value of said counting means; and
an operation means for calculating a brightness of an object using the previously counted value stored in said memory means, the presently counted value, the present charge accumulation time, and the individual pixel signals obtained on the basis of the present charge accumulation of said photoelectric transfer means,
wherein when the output of said real time monitor means does not reach the predetermined threshold value even after the set charge accumulation time passes, charge accumulation of said photoelectric transfer means is continued until the output of said real time monitor means reaches the predetermined threshold value.

31. The photometric apparatus according to claim 30, wherein said predetermined rate can be altered by a leaning function.

32. A photometric apparatus comprising:
a photoelectric transfer means having a plurality of pixels, said photoelectric transfer means being capable of outputting at a high speed the outputs of the individual pixels obtained by a first charge accumulation operation conducted without A/D conversion and of starting a second charge accumulation operation when a predetermined time passes after the first charge accumulation operation is started;
a real time monitor means for monitoring the intensity of incident light in a charge accumulation time of said photoelectric conversion means on a real time basis;
a counting means for counting a time for the output of said real time monitor means to reach a predetermined threshold value.
a memory means for storing the counted value counted by said counting means in the first charge accumulation operation, the counted value obtained in the second charge accumulation operation, the outputs of the individual pixels of said photoelectric transfer means obtained in the second charge accumulation operation; and
an operation means for calculating a brightness of an object on the basis of the data stored in said memory means.

33. The photometric apparatus according to claim 32, wherein the predetermined time between the beginning of the first charge accumulation operation and the beginning of the second charge accumulation operation is an odd multiple of half of a flickering period of a light to be metered.

34. The photometric apparatus according to claim 32, wherein when the charge accumulation time for the first charge accumulation operation is longer than a predetermined time, the outputs of the individual pixels are output.

35. The photometric apparatus according to claim 34, wherein said predetermined time is $tF \times 0.8$, where $tF$ is the flickering period of the light to be metered.

36. The photometric apparatus according to claim 34, wherein said predetermined time is a variable which can be automatically corrected by a learning function.

37. The photometric apparatus according to claim 32, wherein said memory means stores a value obtained by accumulating the individual pixels obtained in the second charge accumulation.

38. The photometric apparatus according to claim 32, wherein part of the means included in said apparatus is used as part of a focal point detecting device.

* * * * *